Nov. 14, 1939.　　　　F. V. BROWN　　　　2,179,684
COCK OR VALVE
Filed Aug. 27, 1937　　　2 Sheets-Sheet 1
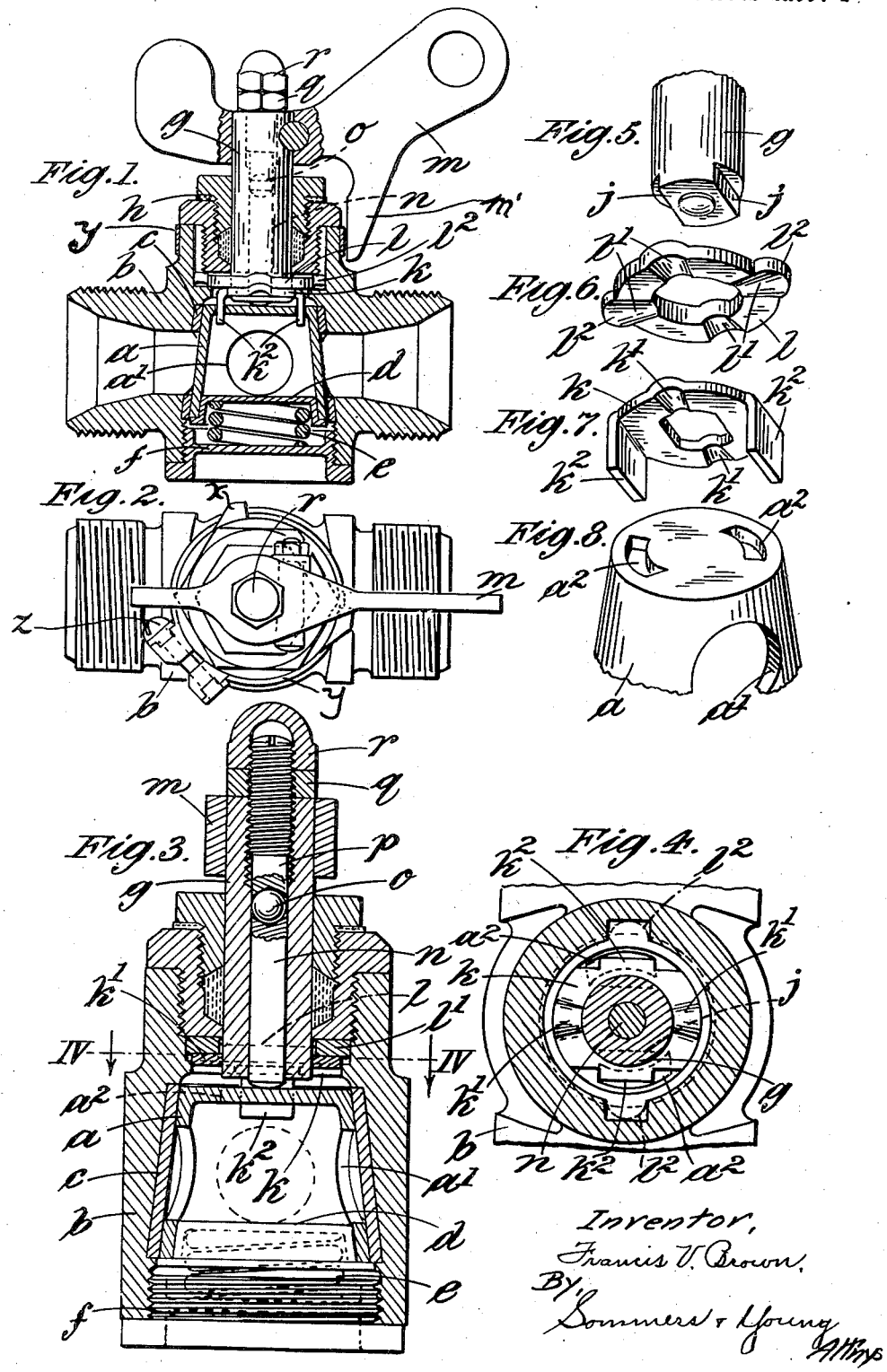
Inventor,
Francis V. Brown,
By Sommers & Young
Attys Nov. 14, 1939.     F. V. BROWN     2,179,684
COCK OR VALVE
Filed Aug. 27, 1937     2 Sheets-Sheet 2
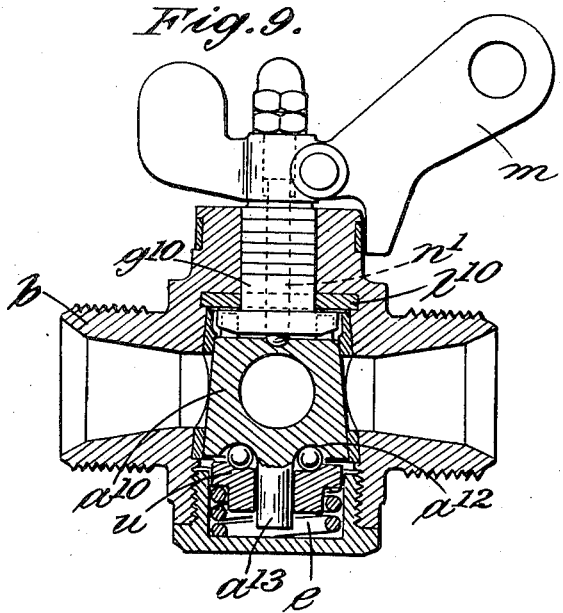
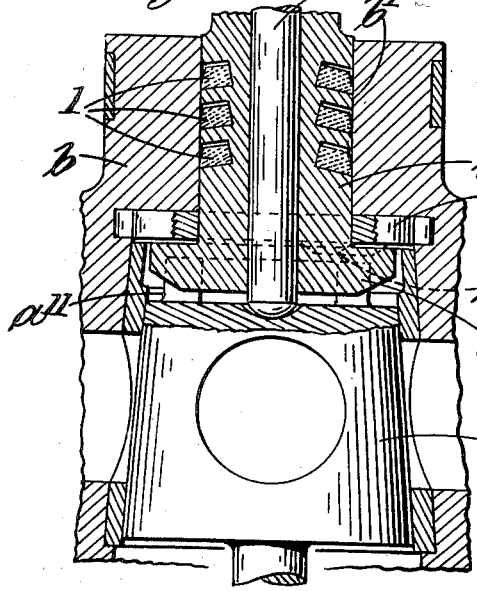
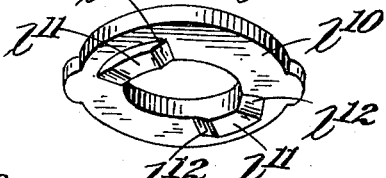
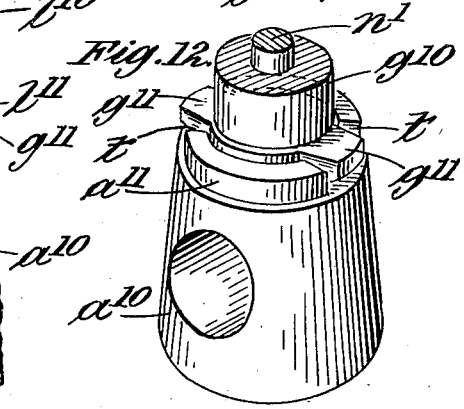
Inventor,
Francis V. Brown
By Sommers & Young
Attys.

Patented Nov. 14, 1939

2,179,684

UNITED STATES PATENT OFFICE 2,179,684

COCK OR VALVE

Francis Victor Brown, London, England, assignor to Aircraftings Limited, Gunnersbury, London, England, a British joint-stock company Application August 27, 1937, Serial No. 161,329
In Great Britain September 7, 1936

7 Claims. (Cl. 251—97)

This invention comprises improvements in cocks or valves and has for one of its objects to provide an improved valve in which the plug is loosened from its seat prior to turning it to or from the opening or closing position.

Improvements in accordance with this invention are particularly applicable to cocks controlling the fuel and/or oil supply for internal combustion engines in aircraft.

Fuel valves on aircraft, particularly in the multimotored variety, invariably have to be operated at some considerable distance from the cockpit. This calls for discriminating choice of operating controls. In order that the operation may be most reliable the operation should call for the minimum of energy to be transmitted.

The fuel for aircraft engines is usually contained in several distributed tanks and the supply from each and the interconnections between the tanks must be readily and certainly controlled. For this reason, there must be no tendency for the valve to stick and to require an effort out of all proportion to the work done for its operation. The operation by distant control in these cases must be as easy and certain as possible.

In cocks of the kind referred to, the plugs are loosened in their seats by the action of cam devices which operate during a lost motion period introduced into the rotary movement of the cock. The axial movement of the plug need only be a very small amount, as it is only necessary to loosen the plug to the extent of a few thousandths of an inch. This is of particular consideration in the case of petrol cocks, for any excessive loosening would permit petrol to carry impurities between the seating faces and thereby endanger the closure tightness of the cock. In order to ensure the smallest possible axial movement essential to free the seating, the present improvements provide a simple adjustment, whereby the extent of the axial movement effected by the cams can be readily altered.

According to this invention the operating stem is provided with means for turnably engaging the plug with a small degree of circular free play or lost motion and with means adapted for coacting with internally disposed and fixed means to produce a camming effect for plug loosening prior to turning from the closed to open position, or vice versa. The salients of the cam are suitably such that the camming effect must be continued during turning of the plug and only cease when the plug reaches the closed or open position. This mode of operation is advantageous for cocks operated by distant control, for the operator senses the completion of an opening or closing operation by the transmitted click or snap which occurs when the camming action ceases. The thrust exerted on the stem by the camming action is transmitted to the plug by a thrust rod which is suitably enclosed within a bore of the stem and longitudinally adjustable therein by a fine screw adjustment in such bore. Thus, with the internal cam arrangement and the thrust rod and adjustment totally enclosed, it is impossible for external influences to derange either the cam action or the fine setting of the screw adjustment.

Heretofore, internally disposed cam devices for positively loosening the conical plug of a cock have comprised two rotary parts, the one having a limited free play relatively to the other and the camming effect being produced during the overtaking of the one part by the other. This does not give the advantageous action of the improved arrangement above described wherein the camming action between a fixed part and a rotary part must continue during the turning of the plug in either direction. Moreover, a thrust rod has been employed to operate between an externally arranged and adjustable cam device and the plug, but in the improved cock all these operating parts are enclosed and protected against external influences.

In order to enable the invention to be readily understood, reference is made to the accompanying drawings illustrating by way of example, several improved constructions in accordance with the invention in which drawings:

Figure 1 is a central vertical longitudinal section of a cock, suitable for use as a petrol cock on aircraft, fitted with adjustable cam mechanism for moving the plug axially from its seat prior to turning it to or from the opening or closing position.

Figure 2 is a plan of Figure 1.

Figure 3 is a central vertical transverse section to a larger scale.

Figure 4 is a horizontal section on the line IV—IV of Figure 3.

Figure 5 is a perspective view of the shaped end of the valve stem.

Figure 6 is a perspective view of a cam plate which is fixed in the body of the valve.

Figure 7 is a perspective view of a co-operative cam plate which is engaged by the end of the valve stem.

Figure 8 is a perspective view of the top of the valve plug.

Figure 9 is a central vertical longitudinal section of a modified construction of cock.

Figure 10 is a view similar to Figure 9 but to a larger scale and of a portion only of the cock.

Figure 11 is a perspective view of a modified form of fixed cam plate employed in the construction seen in Figures 9 and 10, and Figure 12 is a perspective view of the plug of the cock and lower end of the valve stem co-operating therewith.

In the construction illustrated in Figures 1 to 8, the conical plug $a$ of the cock which may be made of rustless steel, is seated in a liner $c$ fixed in the valve casing or body $b$. The plug $a$ is open at the bottom and is formed with diametrically opposite ports $a^1$ in its skirt or conical wall. The top wall of the plug $a$ is formed with two arcuate slots $a^2$ as seen clearly in Figure 8. The slots $a^2$ need not be disposed symmetrically, that is at diametrically opposite points as shown, but can be mainly contained in one semi-circular half, this latter disposition being found to facilitate correct assemblage of the parts by unskilled labour. The body $b$ may be of cast aluminium alloy and the liner $c$ may be of an alloy such as brass, the said liner being externally knurled at its ends so as to key it into the body $b$. The liner $c$ is prevented from endwise movement by flanges or shoulders within the body $b$ as shown.

The plug $a$ is inserted into its seating from below, its open end receiving a shallow cup $d$ of sheet metal to serve as a seating for the upper end of a compression spring $e$ which operates to press the plug against its seating. The bottom end of the spring $e$ is seated in a recess in a cap, nut or plug $f$ screwed into a circular aperture in the bottom of the body $b$.

The valve stem or spindle $g$, inserted downwards through a packing gland $h$ in the upper part of the body, is fitted at its lower end with means for engaging, with lost motion, in the arcuate slots $a^2$ in the plug. Thus, the lower end of the stem $g$ may be formed with flats $j$, as seen clearly in Figure 5, so that the said end may be non-rotatably inserted in the similarly shaped aperture of a cam plate $k$ which is seen detached in Figure 7. The cam plate $k$ may be fixed to the end of the stem $g$ by upsetting edges of such end, or the latter may be grooved and the cam plate $k$ may be forced into or fixed in the groove by suitable means. The cam plate $k$ is embossed at two diametrically opposite points with rounded humps $k^1$, Figure 7, and is formed at two points on its periphery with depending lugs or projections $k^2$ adapted for extending down into the arcuate slots $a^2$ in the plug $a$ with play between the ends of such slots as seen in Figures 3 and 4 in which the actual amount of play provided in practice may be said to be exaggerated. A co-operative fixed cam plate $l$, seen detached in Figure 6, is an annulus embossed with two pairs of recesses $l^1$ corresponding with the humps $k^1$ of the movable cam $k$ and formed with peripheral lugs $l^2$. This fixed cam plate $l$ may be dropped into the gland recess in the body $b$, the lugs $l^2$ taking into recesses in the body to prevent turning of the cam plate $l$. It may then be held tightly on to its seating shoulder by screwing into the recess the stuffing box or body of the gland $h$, as will be apparent from Figures 1 and 3. Any suitable handle $m$ is provided for turning the stem $g$. When the valve is in the closed position illustrated in Figures 1 and 3, or when it is in the open position, the humps $k^1$ of the movable cam plate $k$ rest in two of the recesses or depressions $l^1$ of the fixed cam plate $l$. To operate the cock from the closed to the open position, the stem $g$ is turned counter-clockwise in Figure 4. The first portion of this turning movement will cause the lugs $k^2$ of the movable cam plate $k$ to move idly from one end of the arcuate slots $a^2$ to the other. During this idle movement, the humps $k^1$ of the movable cam $k$ react against the depressions of the fixed cam $l$ and consequently force the plug $a$ axially away from its seating $c$.

The lugs $k^2$ then press against the appropriate ends of the arcuate slots $a^2$ and turn the loosened plug $a$ to the open position, whereupon the humps $k^1$ enter the other two depressions $l^1$ of the fixed cam and permit the spring $e$ to force the plug $a$ tightly on to its seating once more.

In order to enable the extent of the loosening of the plug to be varied, an adjusting means is provided within the stem or spindle. In the example illustrated, the stem $g$ is bored with a central hole into which is inserted freely a thrust rod $n$, seen best in Figure 3, which drops down upon the centre of the top of the plug $a$. Next a ball $o$ is inserted which drops down upon the cupped top end of the thrust rod $n$. Finally, an adjuster screw $p$, the lower end of which is cupped to suit the ball, is screwed down into a screw-threaded upper portion of the bore so as to bear down upon the ball $o$. It will be observed that the stem $g$ presses upon the plug $a$ through the medium of the thrust rod $n$. Screwing the adjuster $p$ up or down a little has the effect of reducing or increasing the effective travel of the thrust rod $n$ when the cam action of the stem $g$ is brought into play, thereby reducing or increasing with very fine adjustment, the extent to which the plug is forced from its seat by the camming action. The adjuster screw $p$ is locked by a tab washer (not shown) and by a lock nut $q$ and is protected by a cap nut $r$. The valve is constructed with the smaller diameter of the plug $a$ towards the operating stem $g$ so that pressure of liquid passing through the valve may further influence the plug on to its seating. It is convenient to limit the turning of the handle $m$ to 90° by providing stop lugs $x$, Figure 2, in the path of a depending lug $m^1$, Figure 1, of the handle $m$. These stop lugs $x$ are formed on a sheet metal band $y$ which is clamped around the body by a clamping screw $z$, Figure 2.

According to the modified construction illustrated in Figures 9 to 12, only a single cam plate, namely a fixed cam plate $l^{10}$ is used, this plate having arcuate flat projections $l^{11}$ on its under surface at diametrically opposite points as seen clearly in Figure 11. These flats $l^{11}$ have ramps $l^{12}$ at their ends for a purpose to be described. The lower end of the spindle $g^{10}$ in this construction is formed or fitted with lateral projections $g^{11}$ at diametrically opposite points, as seen clearly in Figure 12, these projections engaging with play in arcuate notches $t$ cut in an annular rim $a^{11}$ on the small end of the plug $a^{10}$. When the plug $a^{10}$ is in the open position, or in the closed position as illustrated, the projections $g^{11}$ of the spindle lie in the spaces between the flats $l^{11}$ of the cam plate $l^{10}$. Upon turning the spindle for opening the cock, the projections $g^{11}$ first move idly in the notches $t$ but the upper surfaces of the projections $g^{11}$ immediately encounter the ramps $l^{12}$ the resultant camming action causing the plug $a^{10}$ to be pressed away from its seating. The projections $g^{11}$ then come into engagement with end walls of the notches $t$ and turn the loosened plug $a^{10}$ to the open position, the projections $g^{11}$ moving over the flats $l^{11}$. As the open position is reached, the projections move off the flats $l^{11}$ and the spring $e$ is permitted to press the plug tightly against its seating. In this modification, the spindle $g^{10}$ presses the plug away from its seating through the medium of an adjustable push rod in a similar manner to that described with reference to Figures 1 to 8, excepting that the ball o is dispensed with and, instead of separate push rod n and adjuster screw p, there is a one-piece push rod $n^1$ screw-threaded at its upper end. Instead of a hollow plug, the plug a in this modification is of solid form and has a ball race $a^{12}$ formed around a central stub $a^{13}$ on its large end, the spring e operating to press a ball race ring u and its balls, which may be caged, against the race $a^{12}$. This interposition of a ball thrust bearing between the spring e and plug $a^{10}$ further increases the ease of operation of the valve.

The modified construction in Figures 9 to 12 may be provided with a special gland or packing. This consists of one or a series of rings l of elastic material, such as rubber or rubber composition, such ring or rings being moulded to a conical shape, and inserted into a conical recess or recesses formed in the stem $g^{10}$ to be packed. This packing arrangement is more particularly disclosed and claimed in my divisional application Ser. No. 207,144, filed May 10, 1938.

The spindle $a^{10}$ fitted with its three rings as described is inserted into its guide $b^1$ from below, the direction of insertion being with the convex surfaces of the rings leading. As the protruding peripheral portions 2 of the rings enter the cylindrical guide $b^1$ they are pressed back into the grooves, and the peripheral compression causes distension of the inner portions of the rings. This form of packing is found to give great fluid tightness without stiffness, and it is possible to move the spindle $g^{10}$ either rotatably or axially with ease.

I claim:

1. A rotary cone plug valve comprising a valve casing having a conical plug recess, a conical plug in said recess, an axially slidable stem rotatably engaging the plug with a degree of circular lost motion, and two co-operative cam devices disposed internally of the valve casing, one of said devices being fixed within said casing and the other rotatable with and by said stem, the said cam devices being operative for loosening said plug from its seat and the camming action being initiated during initial lost motion between said stem and plug and continued during turning of said plug from the closed towards the open position or vice versa.

2. A rotary cone plug valve comprising a valve casing having a conical plug recess, a conical plug in said recess, an axially slidable stem rotatably engaging the plug with a degree of circular lost motion, and two co-operative cam devices disposed internally of the valve casing, one of said devices being fixed within said casing and the other rotatable with and by said stem, the said cam devices being operative for loosening said plug from its seat and the camming action being initiated during initial lost motion between said stem and plug, continued during turning of said plug and ceasing when the plug reaches the open or closed position.

3. A rotary cone plug valve comprising a valve casing having a conical plug recess, a conical plug in said recess, an axially slidable stem rotatably engaging the plug with a degree of circular lost motion, two co-operative cam devices disposed internally of the valve casing, one of said devices being fixed within said casing and the other rotatable with and by said stem, the said cam devices being operative for loosening said plug from its seat and the camming action being initiated during initial lost motion between said stem and plug and continued during turning of said plug from the closed towards the open position or vice versa, and a thrust rod operative axially between said stem and plug.

4. A rotary cone plug valve comprising a valve casing having a conical plug recess, a conical plug in said recess, an axially slidable stem rotatably engaging the plug with a degree of circular lost motion, two co-operative cam devices disposed internally of the valve casing, one of said devices being fixed within said casing and the other rotatable with and by said stem, the said cam devices being operative for loosening said plug from its seat and the camming action being initiated during initial lost motion between said stem and plug and continued during turning of said plug from the closed towards the open position or vice versa, a thrust rod inserted within a bore of said stem and operative axially between said stem and plug and a screw adjustment within said bore and operative longitudinally upon said thrust rod.

5. A rotary cone plug valve comprising an axially slidable stem rotatably engaging the plug with a degree of circular lost motion, two co-operative cam devices disposed internally of the plug casing one of said devices being fixed within said casing and the other rotatable with and by said stem, the said cam devices being operative for loosening said plug from its seat and the camming action being initiated during initial lost motion between said stem and plug and continued during turning of said plug from the closed towards the open position or vice versa, a thrust rod inserted within a bore of said stem and operative axially between said stem and plug, a screw adjustment within said bore and operative longitudinally upon said thrust rod and a lock nut and cap nut for locking said screw adjustment and protecting it against casual or accidental operation.

6. Rotary plug valve comprising a casing having a conical seat, a conical plug applied to said seat in said casing and formed with an arcuate slot, an operating stem for said plug, a cam-plate disposed internally of said casing, said cam-plate being rotatable with said valve stem and having a projection engaged with said arcuate slot and said projection and slot allowing a degree of circular lost motion between said stem and plug, and a non-rotatable cam plate disposed in said casing in co-operative relation with the first-mentioned cam plate for loosening said plug from its seat during said lost motion.

7. Rotary plug valve comprising a casing, a conical plug applied to a co-operative seat in said casing and formed with a notch, an operating stem axially slidable in said casing and having one end thereof extending adjacent to said plug, a projection on said end and engaged with said notch, said projection and notch allowing a degree of circular lost motion between said stem and plug, and a non-rotatable cam plate disposed in said casing in co-operative relation with said projection for loosening said plug from its seat during said lost motion.

FRANCIS VICTOR BROWN.